United States Patent [19]
Chen

[11] Patent Number: 6,141,558
[45] Date of Patent: Oct. 31, 2000

[54] METHOD AND APPARATUS FOR LOCATING A SUBSCRIBER UNIT IN A COMMUNICATION SYSTEM

[75] Inventor: Brian Cheng-Jean Chen, Palatine, Ill.

[73] Assignee: Motorola, Inc., Schaumburg, Ill.

[21] Appl. No.: 09/074,285

[22] Filed: May 7, 1998

[51] Int. Cl.$^7$ ........................................... H04Q 7/20
[52] U.S. Cl. .......................................... 455/456; 455/440
[58] Field of Search .................... 455/440, 456, 455/115, 226.1, 342, 450, 457, 463

[56] References Cited

U.S. PATENT DOCUMENTS

| | | | |
|---|---|---|---|
| 4,003,060 | 1/1977 | Broce | 343/113 |
| 4,045,799 | 8/1977 | Dapiran | 343/113 |
| 4,433,334 | 2/1984 | Caputi | 343/450 |
| 4,528,567 | 7/1985 | Miles | 343/442 |
| 5,432,841 | 7/1995 | Rimer . | |
| 5,613,205 | 3/1997 | Dufour . | |
| 5,625,364 | 4/1997 | Herrick | 342/449 |
| 5,729,826 | 3/1998 | Gavrilovich | 455/11.1 |

*Primary Examiner*—Daniel S. Hunter
*Assistant Examiner*—Nick Corsaro
*Attorney, Agent, or Firm*—Mario J. Donato, Jr.

[57] ABSTRACT

After determining a distressed mobile subscriber communication unit 100 is within a communication coverage area (60) of a base transceiver station (BTS) (22), a mobile BTS (55) positioned at a first location (201) uses a rotating directional antenna (46) to force mobile subscriber communication units including the mobile subscriber communication unit (100) to hand off communication. When the mobile BTS (55) detects the subscriber ID associated with the mobile subscriber communication unit (100) during handoff, a first direction of the directional antenna (46) is noted. The same procedure is repeated at another location (202) and a second direction of the directional antenna (46) is noted. A triangulation process using the first and second direction of the directional antenna and the first and second locations (201) and (202), reveal the location (203) of the mobile subscriber communication unit (100).

6 Claims, 2 Drawing Sheets

METHOD AND APPARATUS FOR LOCATING A SUBSCRIBER UNIT IN A COMMUNICATION SYSTEM

FIELD OF THE INVENTION

This invention relates to locating a subscriber communication unit in a cellular communication system, and in particular to locating the subscriber communication unit within the coverage area of a base station of the cellular communication system.

BACKGROUND OF THE INVENTION

In an emergency a subscriber of a cellular communication system uses his subscriber unit to call an emergency service, such as 911. Often in emergency situations, the subscriber is unable to provide details of his location that would enable an emergency response unit to locate him.

While prior art systems, such as U.S. Pat. No. 5,432,841 by Rimer, discloses a method of determining the location of a subscriber within a cellular system by identifying the location of a base station from which the emergency call was received, the communication coverage area of a base station can be fairly large. In a city, the communication coverage area of a base station can include many buildings.

Consequently, it would be difficult for the emergency response unit to locate the distressed subscriber within the coverage area of the base station in a timely manner.

U.S. Pat. No. 5,613,205 by Dufour describes a method for manipulating the transmit power of base stations neighboring the base station from which the emergency call was received to force the subscriber unit to hand off to the neighboring base stations. Then by determining the power levels at which handoff occurs to each of the neighboring base stations, arcs are drawn around the neighboring base stations. The intersection of the arcs indicates the location of the subscriber unit.

A disadvantage of this method is, power levels of the base stations in a cellular communication system are set by a predetermined algorithm which reduces interference in the system. Any variation to the predetermined algorithm will substantially increase the probability of interference in the system.

BRIEF SUMMARY OF THE INVENTION

The present invention therefore seeks to provide a cellular communication system which overcomes, or at least reduces the above-mentioned problems of the prior art.

Accordingly, in one aspect, the invention provides a cellular communication system comprising: a communication infrastructure comprising: a stationary communication coverage portion comprising: a communication handoff signal receiver; and a communication handoff signal processor coupled to the communication handoff signal receiver; and a mobile directional communication coverage portion coupled to the stationary communication coverage portion comprising: another communication handoff signal receiver; and a communication handoff signal interrogator coupled to the another communication handoff signal receiver; and at least one mobile subscriber communication unit comprising: a subscriber ID memory; and a communication handoff signal transmitter coupled to the subscriber ID memory.

In another aspect the invention provides a method for locating a subscriber in a cellular communication system, the method comprising the steps of: providing: a plurality of stationary base stations each having a station ID; at least one mobile base station coupled to the plurality of stationary base stations, the at least one mobile base station having a rotatably mounted directional antenna; and a plurality of subscriber units each having a subscriber ID; receiving a communication from one of the plurality of subscriber units at one of the plurality of stationary base stations, wherein the communication includes the subscriber ID of the one of the plurality of subscriber units and the station ID of the one of the plurality of stationary base stations; determining location of the one of the plurality of stationary base stations; moving the mobile base station towards the location of the one of the plurality of stationary base stations and, at a first location, rotating the rotatably mounted directional antenna to selectively provide a selected communication coverage area about the first location; receiving a first plurality of call handoff communications and subscriber IDs from a corresponding plurality of subscriber units including the one of the plurality of subscriber units; storing a first direction of the rotatably mounted directional antenna and the first location of the mobile base station when the subscriber ID of the one of the plurality of subscriber units is received; moving the mobile base station to a second location different from the first location and rotating the rotatably mounted directional antenna to selectively provide a selected communication coverage area about the second location; receiving a second plurality of call handoff communications and subscriber IDs from a corresponding plurality of subscriber units including the one of the plurality of subscriber units; storing a second direction of the rotatably mounted directional antenna and the second location of the mobile base station when the subscriber ID of the one of the plurality of subscriber units is received; determining the location of the one of the plurality of subscriber units using the first and second locations and the first and second stored directions of the rotatably mounted directional antenna.

In yet another aspect the present invention comprises a cellular communication system comprising: at least a first mobile directional transceiver means having a first output for providing a subscriber ID signal, and a second output for providing a first direction signal indicating a first direction of at least one mobile subscriber communication unit means relative thereto; and a mobile processing means coupled to the first output of the at least the first mobile transceiver means, the mobile processing means for identifying a subscriber ID associated with the at least one mobile subscriber communication unit means, and the mobile processing means having a memory for storing the first direction when a subscriber ID associated with the at least one mobile subscriber communication unit means is identified in the subscriber ID signal.

BRIEF DESCRIPTION OF THE DRAWINGS

An embodiment of the invention will now be more fully described, by way of example, with reference to the drawings of which.

DETAILED DESCRIPTION OF THE DRAWINGS

Figure 1:
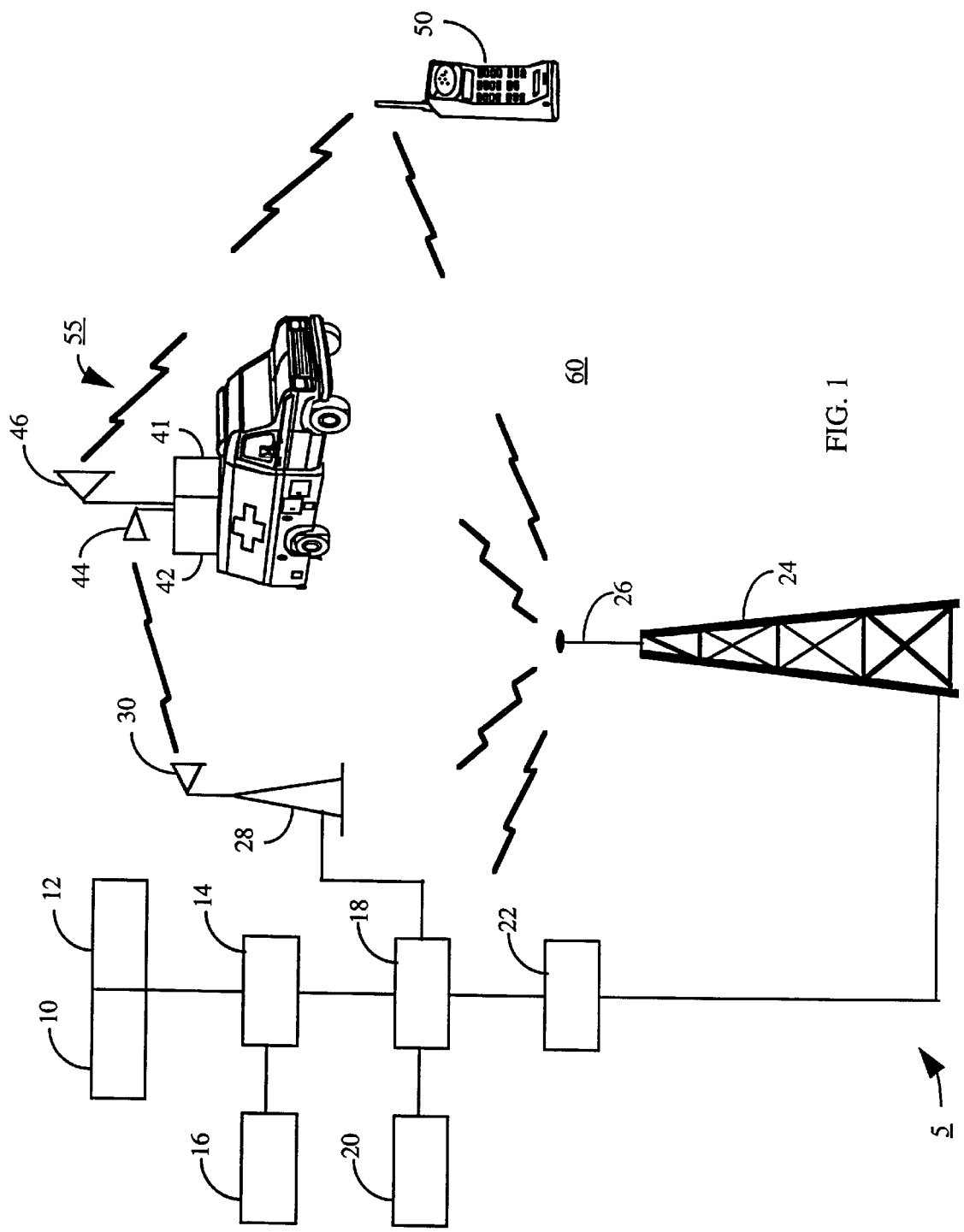
FIG. 1 shows a schematic of a cellular communication system in accordance with the present invention.

FIG. 1 illustrates a fixed base transceiver station (BTS) 22 coupled to an antenna 26 on a tower 24 that supports communications for subscriber units 50 (only one shown) within a communication coverage area 60 of a cellular communication system 5. The cellular communication system 5 is one that comprises a plurality of contiguous communication cells or areas, each having a dedicated communication infrastructure for maintaining communications for mobile subscriber communication units within their respective cells. The dedicated communication infrastructure for each cell are arranged to hand off communications to a neighboring cell when a mobile subscriber communication unit roams into the cells neighboring cell while engaged in a call. Typically, the mobile subscriber communication unit determines which neighboring cell to switch the communications to, and the decision is dependent on various factors including the received signal strength from the dedicated communication infrastructure in the neighboring cells and, where there is more than one service provider, the preferred service provider.

The BTS 22 is coupled to a base station controller (BSC) 18, which in turn is coupled to a mobile switching center (MSC) 14. The cellular communication system 5 also includes a home location register (HLR) 10 that includes a database (not shown) for subscriber information such as mobile identification number (MIN) and electronic serial numbers (ESN) of the subscriber units 50 which are registered for service.

The HLR 10 is coupled to an authentication center (AC) 12 to authenticate the subscriber units 50 before services are allowed. Both the HLR 10 and the AC 12 are coupled to the MSC 14. In addition, the MSC 14 is coupled to an operation and maintenance center for switch (OMCS) 16, and the BSC 18 is coupled to an operation and maintenance center for radio (OMCR) 20. The BSC 18 is also coupled to a mobile BTS 42, which is mounted on a emergency response vehicle 55, via a microwave communication link. A first part of the microwave communication link is provided by a first directional antenna 30 mounted on a tower 28 and coupled to the BSC 18.

The emergency response vehicle 55 carries a second directional antenna 44 and a highly directional antenna 46, both of which are coupled to the mobile BTS 42. The emergency response vehicle 55 also carries a computer 41 which is coupled to both the mobile BTS 42 and a rotating mechanism on which the narrow-beam antenna 46 is mounted. The computer 41 monitors signals transmitted and received by the BTS 42, controls the rotation of the rotating mechanism, and monitors the direction of the rotating mechanism to determine the direction of the narrow beam antenna 46. The computer 41 also includes a memory (not shown) for storing the direction indicated by the rotating mechanism, and for storing a subscriber ID of one of the subscriber units 50. The second part of the microwave communication link is provided by the second directional antenna 44 and the mobile BTS 42.

The second directional antenna 44 could also be an omni-directional or sector type of antenna to provide the communication link with the first directional antenna 30, which could also be an omni-directional or sector type antenna. As is known, it is easier to maintain the communication link when omni-directional antennas are employed, however, other considerations, such as transmission power, range of coverage and interference will need to be taken into account when selecting the first and second directional antennae 30 and 44. The narrow-beam antenna 46 is a Yagi antenna.

Figure 2:
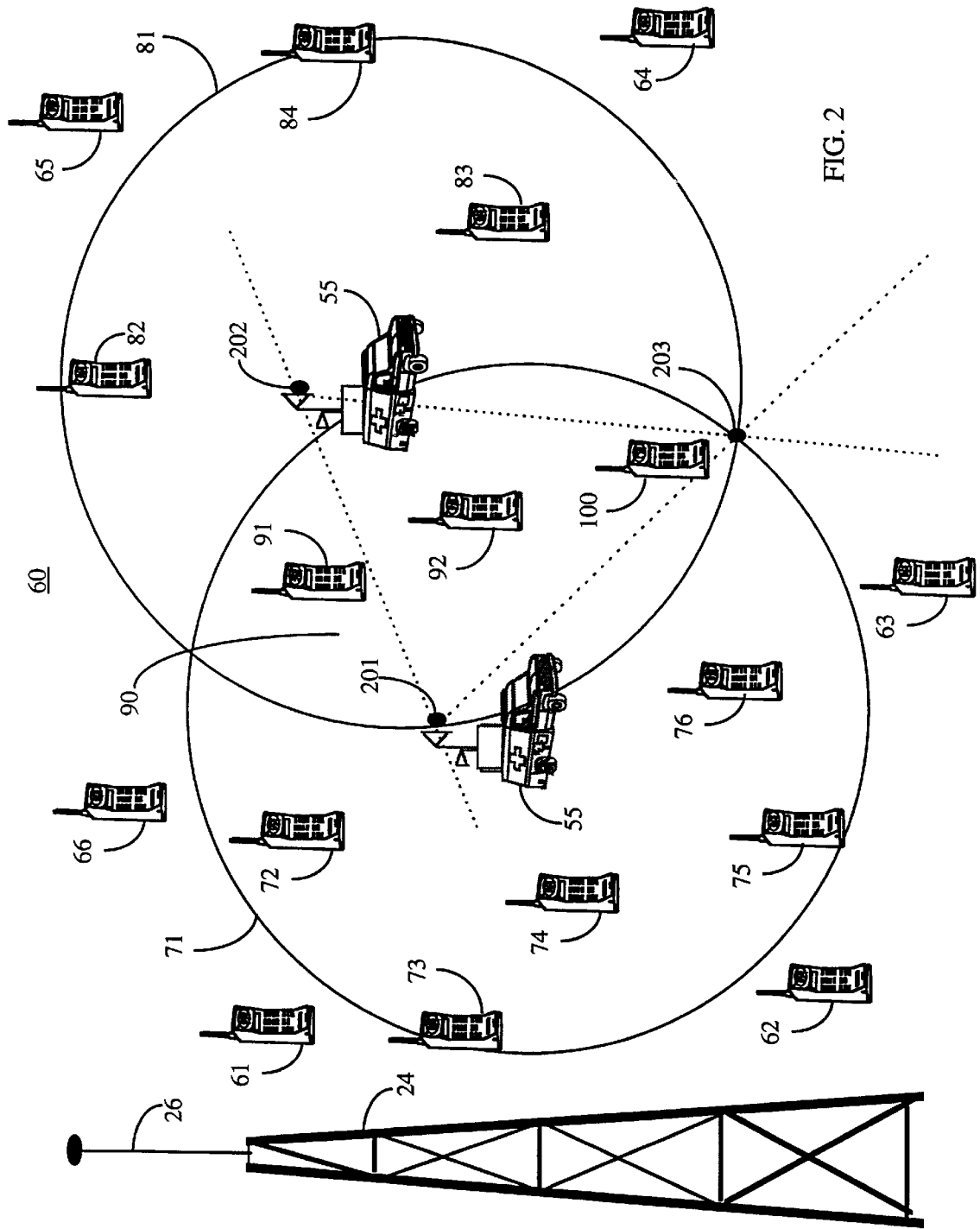
FIG. 2 shows the cellular communication system in FIG. 1 locating a mobile subscriber communication unit.

In FIG. 2, when a distressed subscriber is at a location 203, which will be referred to as a reference location, in the communication coverage area 60, and the distressed subscriber calls an emergency service such as 911 for assistance on a mobile subscriber communication unit 100, an emergency communications center (not shown) receives a Mobile Identification Number (MIN) or subscriber ID of the mobile subscriber communication unit 100 and a base station ID of the BTS 26. The base station ID identifies the BTS which provides communication coverage to the area in which the mobile subscriber communication unit 100 is located and to which the mobile subscriber communication unit 100 is registered when the call was made.

A database at the emergency communication center stores the base station IDs of all the BTSs in the cellular communication system 5 along with their corresponding geographic locations, i.e. such as the longitude and latitude of each location. Hence, using the base station ID of the BTS 26, the location of the BTS 26 is determined, and the mobile BTS 55 is dispatched to the location of the BTS 26. The location of the base stations can be stored and provided in the form of map references, or in descriptive form such as addresses of buildings at which the base stations are located.

In the cellular communication system 5, a subscriber ID is provided to the emergency communications center by a Calling Number Display (CND) capability. In addition, the subscriber ID of the mobile subscriber communication unit 100 is made available to the BTS 22, BSC 18, OMCR 20, MSC 14 and other components of the cellular communication system 5, through which the call is received and processed, by the network signaling protocol.

On route to the location of the BTS 26, emergency response personnel in the emergency response vehicle 55 enter the subscriber ID of the mobile subscriber communication unit 100 into the computer 41. As the mobile BTS 55 enters the communication coverage area 60, the computer 41 ensures that the microwave communication link with the BSC 18 is established and starts the rotating mechanism. As the rotating mechanism turns, the narrow beam antenna 46 scans to produce communication coverage area 71, a part of which is selectively provided with communication coverage when the narrow beam antenna 46 is directed thereto. The speed of rotation of the narrow-beam antenna 46 mechanism is determined by the response time for handoff data to be communicated between the mobile BTS 42 and the mobile subscriber communication unit 100.

When the emergency vehicle 55 is at a first location 201, the scanning narrow beam antenna 46 forces mobile subscriber communication units 72,73,74,75,76,100,92 and 91, which are located within the selected communication coverage area 71, to hand off communications from the BTS 22 to the mobile BTS 42, and to hand off communications back from the mobile BTS 42 to the BTS 22. This occurs because the communication coverage provided by the mobile BTS 42 has a higher transmit radio frequency power output level than the BTS 22, and, as is known, mobile subscriber communication units in a cellular communication system hand off communications to a BTS whose communication coverage results in the best reception. Mobile subscriber communication units 66,61,62,63,66,82,83,84,64, and 65, which are located beyond the communication coverage area 71 of the mobile BTS 42 when it is located at the first location 201, remain registered to the BTS 22.

When the scanning narrow beam antenna 46 points to reference location 203 where the mobile subscriber communication unit 100 is located, the subscriber unit 100 which is registered with the BTS 22, is forced to hand off communications to the mobile BTS 42 because of the higher transmit radio frequency power output level of the BTS 42. The higher radio frequency power output level is a result of the higher gain from the narrow beam antenna 46 and also the optionally higher transmit output power designed into the mobile BTS 42. When handoff occurs, the mobile subscriber communication unit 100 communicates the subscriber ID to the MSC 18, and the computer 41 picks up the subscriber ID and compares it with the previously stored subscriber ID. When the subscriber IDs match, this indicates that the mobile subscriber communication unit 100 has been located, and the computer 41 stores the direction of the narrow beam antenna 46. The stored direction indicates the direction of the mobile subscriber communication unit 100 relative to the first location 210. A line is then drawn on a map from the location 201 of the rescue vehicle 55 in the stored direction of the narrow beam antenna 46, which points to the reference location 203. The process of drawing the line from the first location 201 to the reference location 203 can be done manually on a detailed street map, or with the help of the computer 41 running a software program tailored specifically for this application.

Once the direction of the mobile subscriber communication unit 100 from the first location 201 is known, the emergency response vehicle 55 is driven to a second location 202. Where possible, the direction of the emergency response vehicle 55 when moving from the first location 201 to the second location should preferably be perpendicular to the direction from the first location 201 to the reference location 203. The actual distance between the first and second location 201 and 202 is affected by various parameters including the size of the communications coverage area of the BTS 26 and the transmission power of the mobile BTS 42.

At the second location 202, the emergency response vehicle 55 repeats the sequence of rotating the narrow beam antenna 46, detecting the direction of the mobile subscriber communication unit 100 from the second location 202, and storing the direction of the rotating mechanism when the subscriber ID of the mobile subscriber communication unit 100 is detected. This time, during the scan of the narrow beam antenna 46, only the mobile subscriber communication units 91,92,100,83,82 and 84 hand off communications from the BTS 22 to the mobile BTS 42 and back to the BTS 22.

Another line is drawn from the second location 202 in the direction of the narrow beam antenna 46 when the handoffed subscriber ID matches the previously stored subscriber ID in the computer 41. Based on the intersect of the two lines, the location of the mobile subscriber communication unit 100 is determined.

The accuracy with which the location of the mobile subscriber communication unit 100 is determined is dependent on various factors including the narrowness of the beam of the narrow beam antenna 46, the distance between the rescue vehicle 55 and the mobile subscriber communication unit 100, the number of different locations at which the scanning is performed, as well as the number of iterations of the scanning procedure at each location.

Further, two or more emergency response vehicles could be coordinated to locate the mobile subscriber communication unit by merging their data together. This would also reduce the time required to locate the mobile subscriber communication unit and can also increase the accuracy. The merging of scanning data from the two vehicles can be done either manually or automatically with an software application package running in the on board computers. The information needed for merging would include the location of the rescue vehicles and angles of the narrow beam antenna.

Thus, as is shown, the present invention, as described, advantageously allows a mobile subscriber communication unit to be located within the communication coverage area of a base station of a cellular communication system. This is accomplished by selectively changing the communication coverage within the communication coverage area of the base station to force the mobile subscriber communication unit to hand off communications to a mobile base station. Repeating this process at two locations enables the location of the mobile subscriber communication unit to be determined using a triangulation process.

Hence, the present invention provides a cellular communication system which overcomes, or at least reduces the above-mentioned problems of the prior art.

It will be appreciated that although only one particular embodiment of the invention has been described in detail, various modifications and improvements can be made by a person skilled in the art without departing from the scope of the present invention.

I claim:

1. A method for locating a subscriber in a cellular communication system, the method comprising the steps of:

a) providing:
   a plurality of stationary base stations each having a station ID;
   at least one mobile base station coupled to the plurality of stationary base stations, the at least one mobile base station having a rotatably mounted directional antenna; and
   a plurality of subscriber units each having a subscriber ID;

b) receiving a communication from one of the plurality of subscriber units at one of the plurality of stationary base stations, wherein the communication includes the subscriber ID of the one of the plurality of subscriber units and the station ID of the one of the plurality of stationary base stations;

c) determining location of the one of the plurality of stationary base stations;

d) moving the mobile base station towards the location of the one of the plurality of stationary base stations and, at a first location, rotating the rotatably mounted directional antenna to selectively provide a selected communication coverage area about the first location;

e) receiving a first plurality of call handoff communications and subscriber IDs from a corresponding plurality of subscriber units including the one of the plurality of subscriber units;

f) storing a first direction of the rotatably mounted directional antenna and the first location of the mobile base station when the subscriber ID of the one of the plurality of subscriber units is received;

g) moving the mobile base station to a second location different from the first location and rotating the rotatably mounted directional antenna to selectively provide a selected communication coverage area about the second location;

h) receiving a second plurality of call handoff communications and subscriber IDs from a corresponding plurality of subscriber units including the one of the plurality of subscriber units;

i) storing a second direction of the rotatably mounted directional antenna and the second location of the mobile base station when the subscriber ID of the one of the plurality of subscriber units is received;

j) determining the location of the one of the plurality of subscriber units using the first and second locations and the first and second stored directions of the rotatably mounted directional antenna.

2. A method according to claim 1 where step (j) comprises the step of using a triangulation process.

3. A method for locating a subscriber unit in a cellular communication system, the cellular communication system including a plurality of stationary base stations each having a station ID, at least one mobile base station coupled to the plurality of stationary base stations, the at least one mobile base station having a rotatably mounted directional antenna, and a plurality of subscriber units each having a subscriber ID, the method comprising the steps of:

a) receiving a communication from one of the plurality of subscriber units at one of the plurality of stationary base stations, wherein the communication includes the subscriber ID of the one of the plurality of subscriber units and the station ID of the one of the plurality of stationary base stations;

b) determining location of the one of the plurality of stationary base stations;

c) at a first location wherein the mobile station has been moved towards the location of the one of the plurality of stationary base stations, rotating the rotatably mounted directional antenna to selectively provide a selected communication coverage area about the first location;

d) receiving a first plurality of call handoff communications and subscriber IDs from a corresponding plurality of subscriber units including the one of the plurality of subscriber units;

e) storing a first direction of the rotatably mounted directional antenna and the first location of the mobile base station when the subscriber ID of the one of the plurality of subscriber units is received;

f) at a second location wherein the mobile station has been moved towards the location of the one of the plurality of stationary base stations different from the first location, rotating the rotatably mounted directional antenna to selectively provide a selected communication coverage area about the second location;

g) receiving a second plurality of call handoff communications and subscriber IDs from a corresponding plurality of subscriber units including the one of the plurality of subscriber units;

h) storing a second direction of the rotatably mounted directional antenna and the second location of the mobile base station when the subscriber ID of the one of the plurality of subscriber units is received; and i) determining the location of the one of the plurality of subscriber units using the first and second locations and the first and second stored directions of the rotatably mounted directional antenna.

4. A method according to claim 3 where step (i) comprises the step of using a triangulation process.

5. An apparatus for locating a subscriber unit in a cellular communication system, the cellular communication system including a plurality of stationary base stations each having a station ID, at least one mobile base station coupled to the plurality of stationary base stations, the at least one mobile base station having a rotatably mounted directional antenna, and a plurality of subscriber units each having a subscriber ID, the apparatus comprising:

a) means for receiving a communication from one of the plurality of subscriber units at one of the plurality of stationary base stations, wherein the communication includes the subscriber ID of the one of the plurality of subscriber units and the station ID of the one of the plurality of stationary base stations;

b) means for determining location of the one of the plurality of stationary base stations;

c) at a first location wherein the mobile station has been moved towards the location of the one of the plurality of stationary base stations, means for rotating the rotatably mounted directional antenna to selectively provide a selected communication coverage area about the first location;

d) means for receiving a first plurality of call handoff communications and subscriber IDs from a corresponding plurality of subscriber units including the one of the plurality of subscriber units;

e) means for storing a first direction of the rotatably mounted directional antenna and the first location of the mobile base station when the subscriber ID of the one of the plurality of subscriber units is received;

f) at a second location wherein the mobile station has been moved towards the location of the one of the plurality of stationary base stations different from the first location, means for rotating the rotatably mounted directional antenna to selectively provide a selected communication coverage area about the second location;

g) means for receiving a second plurality of call handoff communications and subscriber IDs from a corresponding plurality of subscriber units including the one of the plurality of subscriber units;

h) means for storing a second direction of the rotatably mounted directional antenna and the second location of the mobile base station when the subscriber ID of the one of the plurality of subscriber units is received; and i) means for determining the location of the one of the plurality of subscriber units using the first and second locations and the first and second stored directions of the rotatably mounted directional antenna.

6. An apparatus according to claim 5, wherein the means for determining the location of the one of the plurality of subscriber units comprises a triangulation process.

* * * * *